Patented Sept. 6, 1932

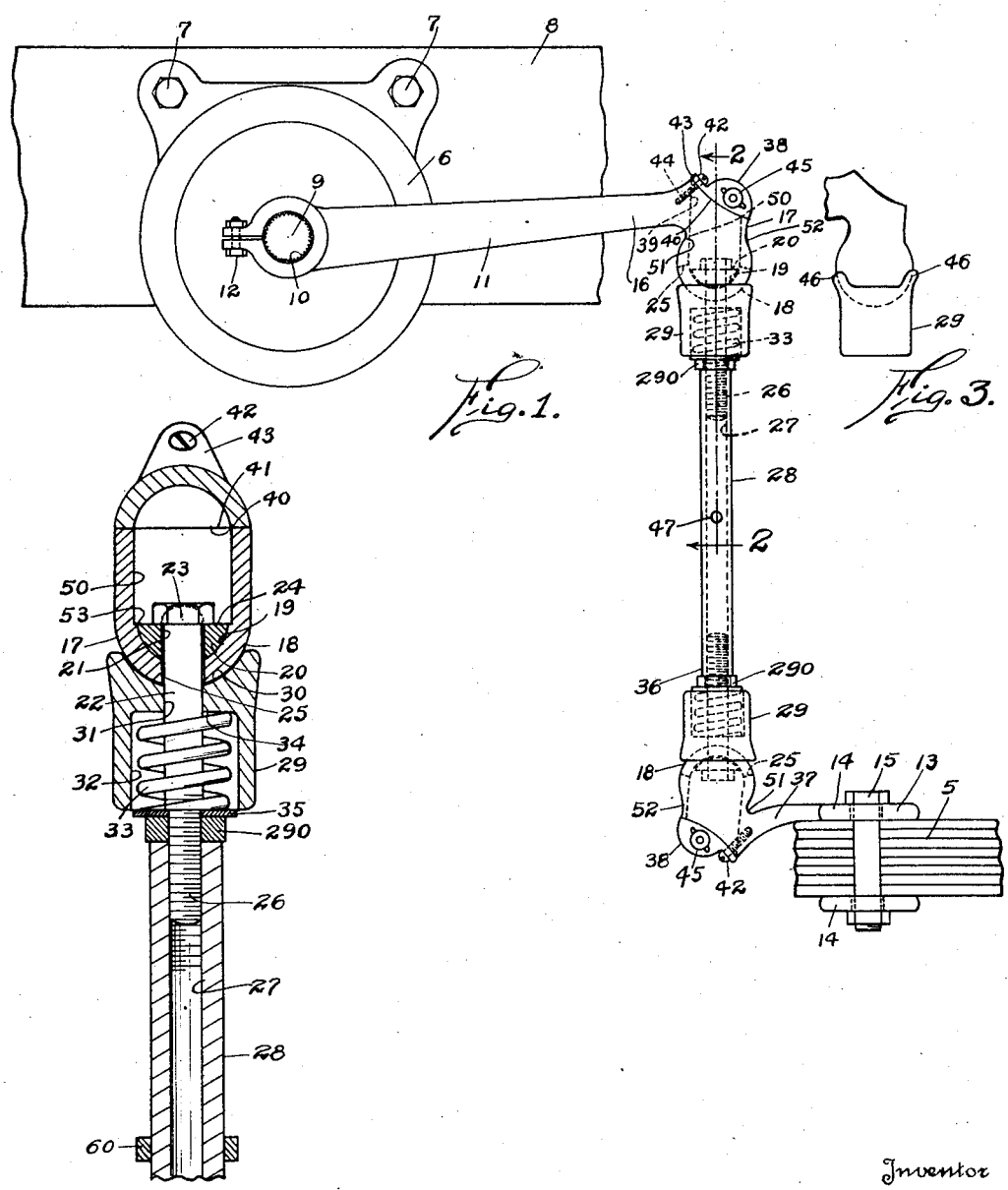

1,875,575

UNITED STATES PATENT OFFICE

JOHN ECKHARD, OF CINCINNATI, OHIO

ACTUATING MEANS FOR SHOCK ABSORBERS

Application filed August 30, 1930. Serial No. 478,951.

This invention relates to improvements in actuating means or link structures for operatively connecting shock absorbers with vehicle springs or axles.

An object of the invention is to provide a link structure of the above character that is simple and more durable than those in common usage, and one which effectively provides for a maximum of relative radial movement between the ball and socket elements thereof, thereby precluding breakage and bending of the lever arm.

Another object is the provision of a novel and sturdy connecting link structure comprising a hollow internally threaded element that may be cut off at a desired length to suit the requirements of the vehicle to be equipped.

Another object is to provide a ball and socket type of actuating means that is constructed to permit the provision of large sliding surfaces between the ball and socket, and to eliminate, by disposing the arm and connecting link in a common plane, the strains to which the ordinary off-set type of device is subjected.

Another object is to retain the large sliding surfaces between the ball and socket elements, by the provision of a comparatively long and narrow slot 25 in the ball element, rather than a circular opening.

These and other objects are attained by the means described herein and disclosed in the accompanying drawing, in which:

Fig. 1 is a side elevational view of the actuating means or link structure operatively connected with a vehicle spring and a conventional shock absorber.

Fig. 2 is a cross sectional view taken on line 2—2 of Fig. 1.

Fig. 3 is an elevational view of a modified form of ball and socket structure of the invention.

The actuating means or link structure of the present invention is disclosed in operative relationship with a vehicle spring 5 and a conventional shock absorber 6 which is bolted or otherwise secured, as at 7, to the frame 8 or other suitable part of a vehicle. The shock absorber has extending therefrom a piston shaft 9 adapted to receive in clamping relation the bore or bearing 10 provided in the arm 11. The piston shaft and bearing 10 may be provided with flutes or serrations 12 to preclude relative movement thereof when the device is in use. Any suitable means such as a bolt and nut 12 may be provided for securing the arm to the piston shaft. It is to be understood that the type of shock absorber to be actuated by the device of this invention is immaterial to the invention, wherefore the shock absorber disclosed need not be described in detail, it being sufficient to state that the shock absorber has an extending piston shaft to which the arm 11 may be secured.

The invention is not to be restricted to the type of spring clamp 13 disclosed herein, for it is well known that such clamps may be replaced by clamps for the axle of the vehicle, and that the clamps may be modified to receive such axle. The simple spring clamp disclosed herein for purposes of explanation comprises plates 14 that extend transversely of and overhang the sides of the spring, the plates having clamped between them the spring leaves by means of two or more bolts 15 extending through perforations in the plates.

The free end 16 of arm 11 is provided with an extension 17 projecting forwardly of the arm at an angle thereto, said extension having a spherical outer surface 18 and a sphere-receiving inner socket 19 substantially concentric therewith. The socket 19 is adapted to receive therein a part ball 20 which is provided with a bore 21 for reception of a bolt 22 having a head 23 in abutment upon the flat top portion 24 of the part ball. The bolt extends through an elongated slot 25 in the socket and the threaded end 26 is received in the threaded bore 27 of the hollow link member or connector 28. A nut 290 serves to lock the bolt and connector 28 against relative movement.

Intermediate the nut and end 17 is disposed a sleeve or bearing member 29 one end of which has a socket 30 for reception of the spherical outer surface 18 of end 17. The sleeve has a central bore 31 for receiving the bolt shank 22, and said bore is enlarged as at 32 for receiving a spring 33 which encircles the bolt. The spring abuts the dividing wall 34 of the sleeve and a washer 35 which abuts the lock nut 290. From the foregoing it should be apparent that by placing the part ball 20 upon the bolt shank and then inserting the bolt through the openings 25, 31 and 32, with the threads of the bolt engaging the threaded bore 27, the joint may readily be assembled as in Fig. 2, the spring 33 serving to hold the various spherical surfaces in yielding abutment upon one another.

It should be observed that the sleeve or connector 28 lies in a plane with the arm 11, wherefore any force tending to rotate the arm will be transmitted directly upon the axis of the sleeve, thereby obviating twisting strains upon the ball and socket members. The advantages over structures having off-set ball and socket members are obvious, and the straight line transmission of force insures maximum strength and elimination of undue wear. By the above arrangement, the ball and socket members may be made large and sturdy without detracting from the appearance of the device.

The construction at the lower end 36 of the sleeve is identical with that at the upper end, the only difference being the provision of a spring or axle clamp 13 on the arm 37 instead of the structure 10—12 as on arm 11. As stated before, the particular type of clamp 13 is immaterial to the present invention.

Means are provided for enclosing the ball and socket structures at each end of the connecting link. Said means consists of a dust cap 38 having bearing faces 40 coinciding with the bearing faces 41 of the ball and socket portion 17 of the arm, and the cap is held thereon by means of a screw or other securing means 42 which passes through a perforate inclined lug 43 on the cap and threadedly engages a bore 44 in an inclined abutment surface 39 on the arm 11. Any suitable type of grease or oil fitting 45 may be associated with the cap, or if desired, with the socket portion 18.

In Fig. 3 is disclosed a ball and socket joint substantially the same as that of Figs. 1 and 2, there being provided on the sleeve or bearing socket member 29 a pair of upwardly extending ears 46 shaped to follow the contour of the ball portion 18, thereby serving to insure the exclusion of dirt and water from the ball joints. It should be clear, however, that the sockets of members 29 may be formed deep enough to accomplish the same result, if desired.

The sleeve 28 may be provided with any simple means, such as a perforation 47 for receiving a suitable rod or tool, whereby the sleeve may be precluded from turning when the lock nuts 290 are tightened. The sleeve is designed to be cut off, when necessary, to decrease the distance between the upper and lower ball and socket joints. The provision of the simple tube or sleeve 28 increases the strength of the device and renders it readily applicable to all makes and types of vehicles. As indicated at 60, (Fig. 2), the perforation 47 may be eliminated and a hexagonal portion substituted for receiving a wrench.

The means for obtaining a maximum of relative ball and socket movement will now be described in detail. It should be readily apparent from the disclosure in Figs. 1 and 2 of the drawing, that the sphere receiving inner socket 19 on the extension or free end of arm 11 is not merely a spherical depression but a spherical depression terminating in a cylinder 50 which may be of substantially the same diameter as the part ball 20. The provision of the cylindrical portion 50 permits the ball and socket portion 18 of the arm to depend downwardly from the end of the arm, below the centerline thereof. By means of this construction, the spherical outer surface 18 of the extension 17 may be shaped to provide a considerable portion of a sphere so that an extensive surface is provided for contact with the socket 30 and so that a long slot 25 may be formed therein to allow great movement of the connecting rod relative to the arm 11. It should be noted that the outer spherical surface 18 is permitted to continue for a considerable distance above the center point of the sphere, there being enough metal in the walls thereof to allow for cutting into the walls, as at 51 and 52, for extending the spherical surface in the direction of the top of the cylindrical portion 50. As indicated at 53 (Fig. 2) the cylindrical portion 50 preferably is reamed or drilled out slightly larger than the diameter of the part ball 20 so that the inner spherical surface 19 may readily be machined without necessitating accurate machining of the cylindrical portion 50. It is to be noted that sufficient metal remains in the region of the cut-away portions 51—52 and the screw 44, to afford the required amount of arm strength. The top annular edge of the sleeve or socket member 29 may reach the cut-away portions 51 and 52 when the connecting rod 28 is moved to the extreme positions, which include an arc of approximately 120 degrees. The width of the long slot 25 is such as to allow but little lateral movement of the connecting rod relative to the plane of the arm, thereby reserving a maximum sliding surface for the socket portion of sleeve 29.

From the foregoing, it should be observed that a durable and wear-resisting structure is secured and that the relative movement of the parts in the plane of arm 11 is sufficiently great to preclude bending or fracture of the arm 11 due to the sleeve or socket member 28 striking the arm when in use.

It is to be understood that various modifications and changes in structural details of the device may be made, within the scope of the appended claims, without departing from the spirit of the invention.

What is claimed is:

1. In combination an arm having a socket on an end thereof the socket having an opening therein the axis of which opening lies in the plane of the arm, a spherical portion on the said end of the arm substantially concentric with the socket interior, a bored sleeve having a socket depression therein substantially concentric with the bore, the bore being enlarged at one end for reception of a spring, a spring in the enlarged portion of the bore, a dividing wall in the sleeve between the spring and socket portion, a part-sphere element received in the socket of the arm, a screw threaded element associated with the part sphere element and extending through the socket opening and the bore of the sleeve, and a tubular connector having a threaded bore for receiving an end of the screw threaded element.

2. In combination an arm having an extension on one end thereof developed into a ball and socket member, the extension having a slot therein, the interior of the extension being hollowed out to receive a portion of a sphere and the exterior thereof being spherical in shape for reception in a socket, a bearing member having a socket in which the spherical exterior of the extension may be disposed, a part sphere element disposed interiorly of the extension, means associated with said element and extending through the slot for holding said element, the extension and the bearing member in contacting relationship, and a removable cap for covering the hollowed out portion of the extension.

In testimony whereof, I have hereunto subscribed my name this 29th day of August, 1930.

JOHN ECKHARD.